United States Patent
Paglericcio

[11] Patent Number: 6,089,193
[45] Date of Patent: Jul. 18, 2000

[54] HAND GRIP FOR ANIMAL LEASH

[75] Inventor: Fernando Paulo Paglericcio, Russell, Canada

[73] Assignee: Husher International, Inc., Russell, Canada

[21] Appl. No.: 09/305,375

[22] Filed: May 5, 1999

[30] Foreign Application Priority Data

Jun. 6, 1998 [CA] Canada ................................. 2236956

[51] Int. Cl.⁷ .................................................. A01K 27/00
[52] U.S. Cl. ........................................... 119/795; 119/797
[58] Field of Search .................... 119/770, 792, 119/793, 795, 797, 798; 2/160; D30/153

[56] References Cited

U.S. PATENT DOCUMENTS

| | | | |
|---|---|---|---|
| D. 359,598 | 6/1995 | Forbes | D30/152 |
| 2,248,114 | 7/1941 | Norton | 119/797 |
| 2,275,701 | 3/1942 | Taylor | 119/798 |
| 2,821,168 | 1/1958 | Forbes | 119/795 |
| 3,332,398 | 7/1967 | Mintz | 119/797 |
| 3,603,295 | 9/1971 | Shuman | 119/795 |
| 4,391,226 | 7/1983 | Guthrie | 119/797 |
| 5,226,190 | 7/1993 | Lynch | 2/160 |
| 5,435,273 | 7/1995 | Landis et al. | 119/795 |
| 5,491,984 | 2/1996 | Loch | 2/160 |
| 5,718,189 | 2/1998 | Blake | 119/770 |

*Primary Examiner*—Peter M. Poon
*Assistant Examiner*—Elizabeth Shaw
*Attorney, Agent, or Firm*—Jones, Tullar & Cooper, P.C.

[57] ABSTRACT

A hand grip for an animal leash includes a single length of material stitched to create a first encircling band for reception of an individual's thumb and a second band for encircling the body portion of the individual's hand. The second band has a major portion and a minor portion and there is a connection point generally located at the juncture of the major and minor portions. Preferably the connection point is a "D"-ring pivotally secured to the hand grip by a short length of material stitched to the outer surface of the hand grip. A short connection leash attached to the "D"-ring has a swivel clasp at the distal end thereof for attachment to the loop of a regular leash or even directly to an animal's collar. By wearing the hand grip of this invention the individual does not need to use the fingers of a hand to grip the leash and those fingers are now free to hold on to another object such as a bag or a package.

10 Claims, 3 Drawing Sheets

HAND GRIP FOR ANIMAL LEASH

The present invention relates to control devices for animals in general and to a hand grip for an animal leash in particular.

BACKGROUND OF THE INVENTION

It is usual for animals such as dogs to be restrained while outdoors by way of a leash connected at one end to the dog's collar. The dog's handler or owner holds the other end of te leash while taking the dog for a walk, the typical leash having a loop at the free end. The handler places his or her hand through the loop so that it is gripped by the fingers or so that it fits over the handler's wrist, with the fingers then gripping the leash itself for full control of the animal. If the handler wants to carry something at the same time as he or she has an animal on a leash it becomes necessary to carry the article in the other hand or to try to carry the article in the same hand that has control of the leash. This can be difficult if the article is bulky or does not have it own handle since the handler's fingers are not free enough to perform the dual task of holding the article and controlling the leash. There is a need for an accessory that will overcome this problem and allow the handler to control the animal on a leash while giving the handler more flexibility to use his or her fingers for other tasks such as carrying articles.

SUMMARY OF THE INVENTION

The present invention provides a hand grip accessory that can be used with typical leashes and animal collars and which provides additional freedom for the user's fingers while being comfortable and effective in controlling the behavior of an animal such as a dog or a cat. The hand grip of this invention fits over the user's hand and includes a pair of encircling bands, one of which encircles the users thumb and the other of which encircles the body portion of the user's hand adjacent the thumb. The bands are formed from a narrow strip or length of a strong yet flexible material with the ends being stitched to adjacent portions of the material to create and define the thumb and hand band portions thereof. The material of the hand grip is flexible and tough, being somewhat coarse on the outside and smooth on the inside and includes a central core of a flexible, resilient material such as a strip of foam. This makes the hand grip strong, yet flexible and soft against the user's hand, making it comfortable to wear.

The band which encircles the hand portion includes major and minor portions and generally has the shape of an ellipse that is angularly truncated at one end. At the junction of the major and minor portions there is a connection point for connecting the hand grip to the leash or to a connecting leash which in turn can be connected to the leash itself or to the animal's collar. The connection point preferably is a "D"-ring that is pivotally held against the outer surface of the hand grip by a short length of material stitched to the outer surface. By using such a connection point the handler can use the hand grip on either hand since the leash or the connecting leash will always extend forwardly from the hand grip towards the animal. Also, the handler can turn the hand grip upside down, which has the effect of putting the connection point at the edge of the hand so that the connecting leash extends forwardly adjacent the pinky finger rather than along the middle finger at the back of the hand. Different people may prefer to have the leash controlled from the edge of the hand rather than the back and vice versa. If no connecting leash is utilized then the loop of the animal leash can be tied to the "D"-ring directly. If a connecting leash is provided the proximal end thereof can be permanently connected to the "D"-ring, with a swivel clasp provided at the free or distal end thereof for removable connection to the loop or free end of the animal leash. The connecting leash can be short, intermediate or long in length, with a long connecting leash being capable of direct attachment to an animal's collar, meaning that a separate animal leash is not required.

The hand grip of this invention fits snugly and comfortable over the user's hand and thumb and provides firm control of the animal through the leash attached thereto. The hand grip of this invention allows the user to keep his or her fingers relatively free to carry articles such as a bag or a package that does not have a separate handle associated therewith. Even if the user is not carrying something else his or her fingers can be more relaxed than with a standard leash since the forces required to control the leash are provided more by the hand than the fingers. Should additional control be necessary the fingers can be closed over the palm portion of the elliptical band for a stronger hold on the grip.

In summary, the present invention may be considered as providing an animal leash hand grip comprising: a first narrow, encircling band adapted to receive a user's thumb therethrough; a second narrow, encircling band integrally connected to the first band and adapted to receive a user's hand therethrough; said second band including a major portion and a minor portion; and connection means on the hand grip generally at the junction of the major and minor portions for connecting the hand grip to an animal collar or to an animal leash.

DESCRIPTION OF THE PREFERRED EMBODIMENT

Figure 1:
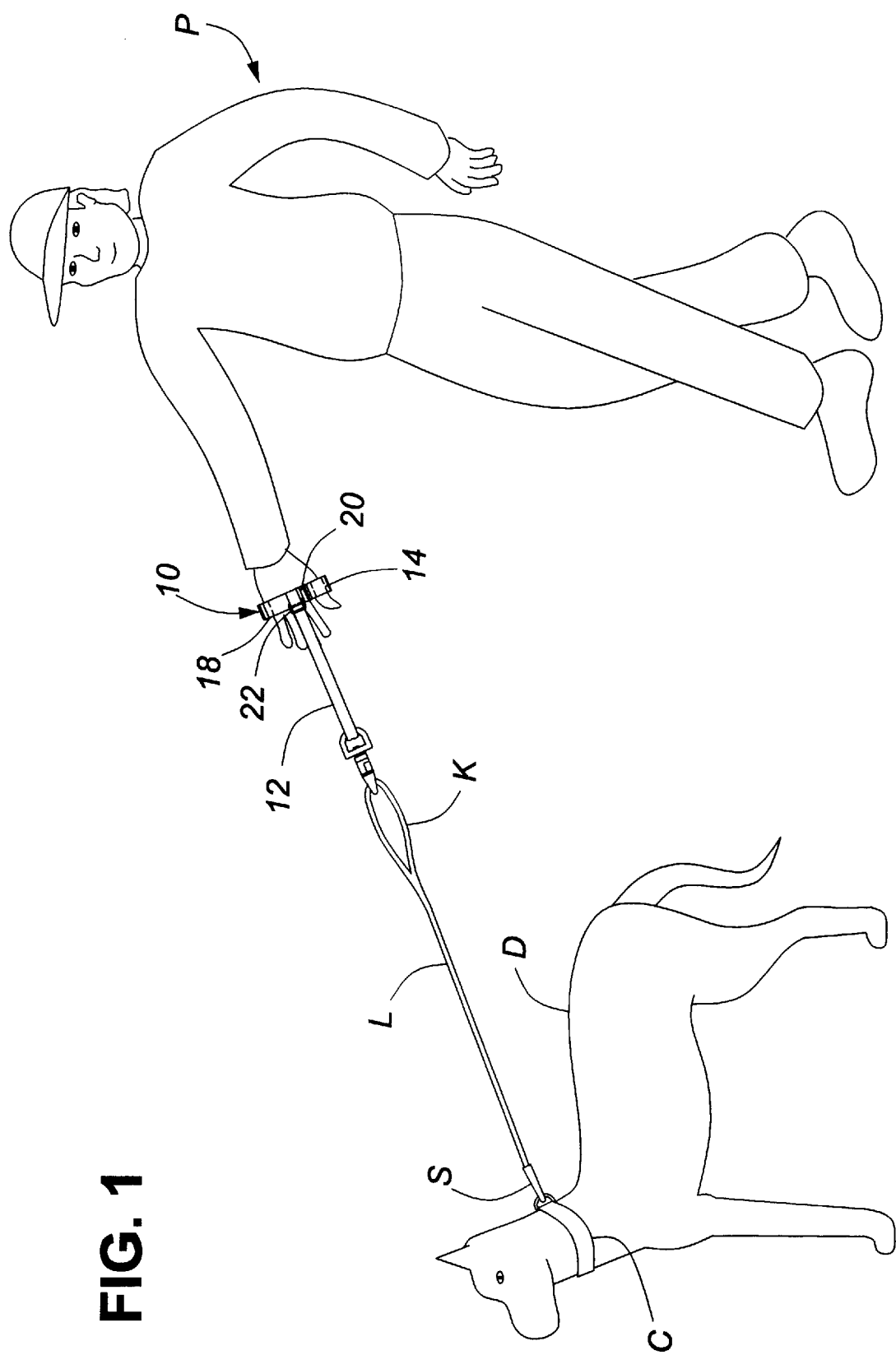
FIG. 1 is a perspective view of the hand grip of this invention shown in one position of use and in conjunction with a standard leash.

FIG. 1 shows an individual P walking a pet animal such as a dog D. The individual controls the animal by way of a leash L that is connected at a distal end thereof to a collar C worn by the animal, the connection being by way of a swivel clasp S. The leash L has a length of about 2 m and at its proximal end it terminates in a loop K that the individual would normally hold in his or her hand, or would wear around his or her wrist, with the fingers of the hand gripping the leash proper. This is uncomfortable and means that the fingers of the hand cannot be used otherwise, as to hold a package or a bag. With the hand grip 10 of the present invention, shown in the drawing as being used by the individual P, the individual is capable of carrying an article in the hand that controls the animal. The hand grip 10 is illustrated as fitting over the individual's hand, leaving the fingers free, the hand grip also including a short connection leash portion 12 that connects the hand grip to the regular leash, as to the loop K at the proximal end of the leash.

Figure 2:
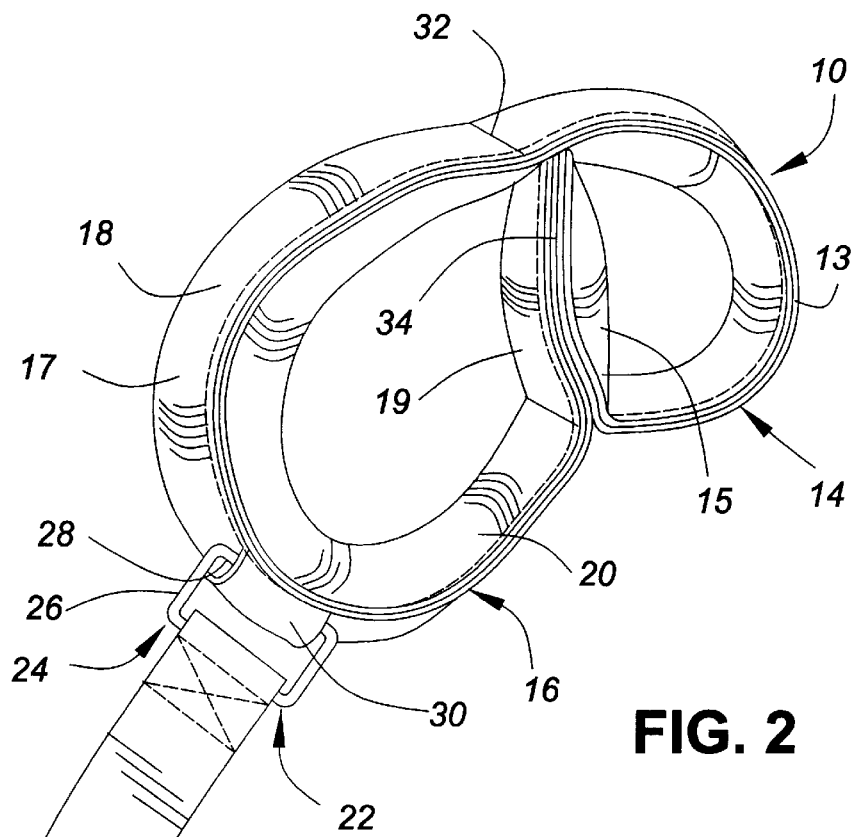
FIG. 2 is an enlarged perspective view of a preferred embodiment of the hand grip of this invention.

FIG. 2 of the drawings shows the hand grip of this invention in greater detail. Therein it is seen that the hand grip 10 includes a first encircling band 14 that is particularly adapted to fit reasonably snugly over the thumb of the individual that will be using the hand grip. This band may be characterized as having generally a "D" shape. The grip includes as well a second encircling band 16 that is connected to the first band and that is adapted to reasonably snugly encircle the body portion of the individual's hand. The second band includes a major portion 18 that in one orientation will rest against the individual's palm and a shorter minor portion 20 that will rest against the back of the individual's hand. Generally at the junction of the major portion 18 and the minor portion 20 there is a connection point 22 to which the connection leash 12 is attached, or to which a regular leash L can be directly secured.

The preferred embodiment of the present invention is shown in FIG. 2 wherein it is seen that the connection point 22 is constituted by a "D"-ring 24 having a somewhat flattened "U"-shaped portion 26 and a straight bight portion 28. The "D"-ring 24 is commercially available and is formed from stainless steel, chromed steel or plastic. The "D"-ring is held closely adjacent the outer surface of the hand grip 10 by a piece of material 30 which extends transversely to the outer surface, through the "D"-ring and across the bight portion 28. The ends of the piece 30 are stitched to the hand grip so that the "D"-ring can pivot on the outer surface whereby any leash or connection leash attached to the "D"-ring can extend in either direction away from the hand grip, meaning that the hand grip can be worn on either the left hand or the right hand by the user of the hand grip.

FIG. 2 also shows that the hand grip of this invention is formed from a single length of material. The first band 14 is formed into an encircling generally "D"-shaped configuration with one end of the length of material being stitched to the material as at 32 to close the band. The first band thus has an arcuate portion 13 and a generally straight portion 15. The second band is formed into a configuration that may be characterized as being generally elliptical with an arcuate portion 17 and a truncated end portion 19. The truncated end portion 19 of the material is laid against and is stitched to the straight portion 15 of the first band as at 34 and the free end of the length of the material at the truncated end portion is stitched to the material at 32 as well. Formation of the hand grip is therefore a simple procedure, requiring very little intricate work.

Figure 3:
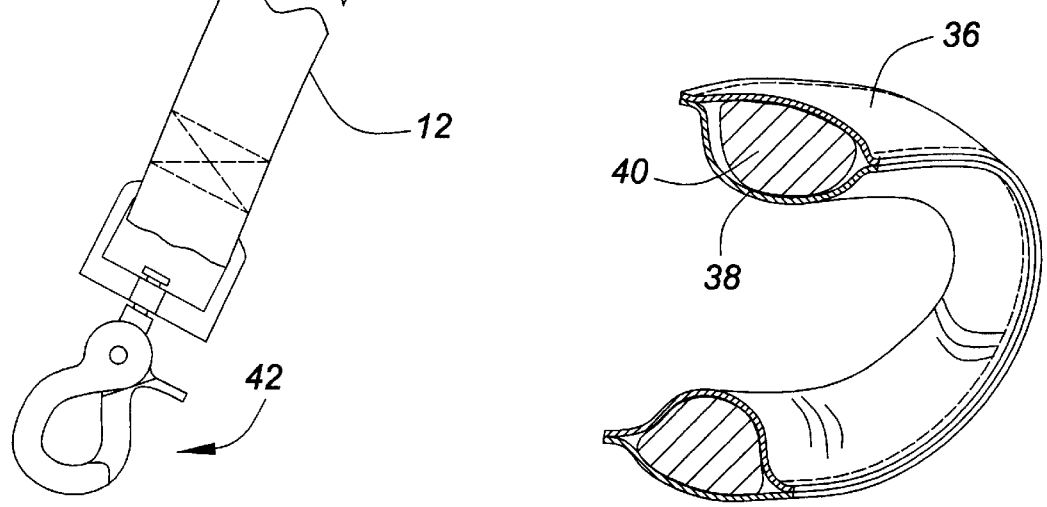
FIG. 3 is a perspective, partial sectional view of the hand grip showing the construction thereof.

FIG. 3 shows in partial cross-section the construction of the material used to produce the hand grip of this invention. Therein it is seen that the material used includes an outer layer 36 of a generally coarse, strong, yet flexible nylon web material having a width of about 2.5 cm, an inner layer 38 of a generally smooth, strong, yet flexible nylon material of the same width as the outer layer, and a soft, flexible core 40 of a continuous foam material. The outer layer 36 and the inner layer 38 are stitched together along the edges and ends thereof to encapsulate the core 40 between the layers, the result being a length of material that has a soft, yet flexible feel to it and is generally elliptical in transverse section. The soft inner layer will rest against the individual's skin and will not abrade it while it is being worn and the animal is tugging on its leash. The material however is extremely strong and will not be torn by the pulling actions of the animal or by any obstacle that leash or the hand grip might encounter.

Returning to FIG. 2 it will be seen that the short connection leash 12 is also formed of the same coarse web material as the outer layer 36. The proximal end of the connection leash is looped through the "D"-ring and stitched to the connection leash so as to permanently secure the connection leash to the hand grip. At the distal end thereof the connection leash is provided with a commercially available swivel clasp 42 that can be connected directly to an animal's collar or to the loop K of a regular leash. The connection leash can come in various lengths, such as short (0.3 m), intermediate (0.5 m), or long (1 m). One would typically connect a short or an intermediate length connection leash to a regular leash, while one would typically connect a long connection leash directly to the animal's collar, meaning that a regular leash would not be required. Because of the pivoting ability of the "D"-ring relative to the hand grip one can use the hand grip on either hand, without having to purchase a specific hand grip for the hand that the individual would normally control the animal.

Figure 4:
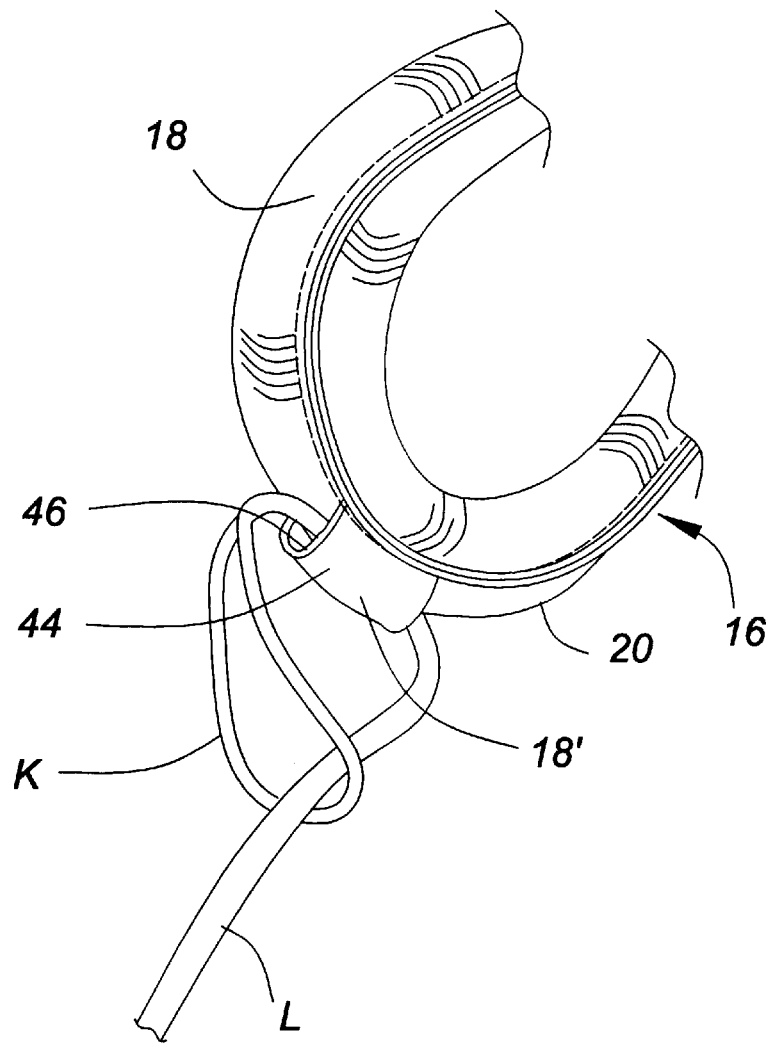
FIG. 4 is a view similar to FIG. 2 showing another way of connecting a leash to the hand grip.

FIG. 4 illustrates another embodiment of the present invention, wherein it is seen that the connection point 18' is defined merely by a piece of web material 44 stitched transversely to the outer surface to create a small loop 46. It would be possible to attach a regular leash to this loop by passing the loop K through the loop 46 and the leash L through the loop K, pulling the leash L tight so as to secure it to the loop 46. Alternatively, a connection leash having a swivel clasp at each end thereof could be used, with one clasp being connected to the loop 46 and the other clasp being connected to the loop K of a regular leash or to the animal's collar.

Figure 5:
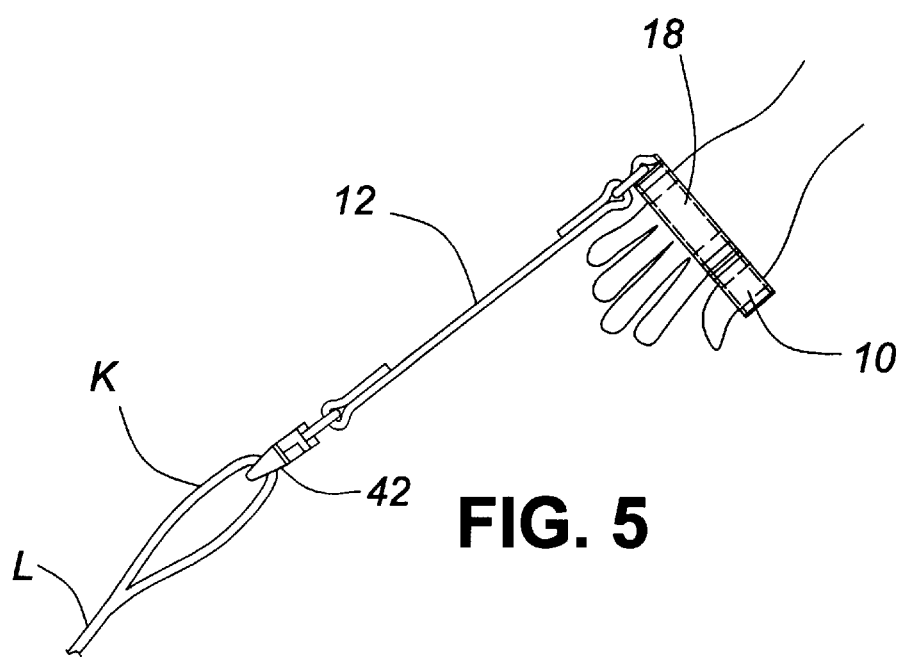
FIG. 5 is a view similar to FIG. 1 showing another way of holding the hand grip of the invention.

FIG. 5 illustrates another way of wearing the hand grip of this invention, in comparison to what is shown in FIG. 1. In FIG. 1 the minor portion 20 rests against the back of the user's hand and the connection point 18 is aligned generally with the middle finger. The connection leash extends forwardly adjacent the back of the users hand. If one were to invert the hand grip or turn it upside down so that the major portion 18 rests against the back of the hand as seen in FIG. 5 then the connection point will lie against the edge of the user's hand so that the connection leash can extend forwardly from that point. Some people may find the FIG. 5 orientation to be preferred while others may find the FIG. 1 orientation to be the one that they like best. Some people may use either orientation depending on the animal and whether they are trying to carry other articles. With either orientation of the hand grip the intent of the invention is still achieved, in that the user will have fingers that remain free to carry articles therein without losing control of the animal.

The present invention provides a hand grip that enables an individual to comfortably control an animal attached to a leash while enabling the individual to keep his or her fingers free to hold an article such as a bag or a package. Should the animal suddenly bolt or try to pull away from the individual it is a simple matter of the individual squeezing the palm portion of the hand grip to avoid the hand grip coming loose from the individual's hand and to increase the degree of control exercised on the animal. The hand grip is comfortable to wear and will not chafe the user's skin and it can be worn on either hand at the decision of the user.

The foregoing has described the preferred embodiment of the present invention. It would be possible, however, to modify the hand grip of this invention without departing from the spirit thereof, as for example by making the hand grip adjustable to fit the user's hand more snugly. This would be a desirable option but it would increase the cost of manufacture considerably. It would be preferable to manufacture the hand grip of the invention in several sizes (e.g. small, medium, and large). The scope of protection to be afforded this invention is to be determined from the claims appended hereto.

What is claimed is:

1. An animal leash hand grip comprising: a first narrow, generally circular band adapted to snugly receive a user's thumb therethrough; a second, narrow generally elliptical band integrally connected to said first band and adapted to snugly receive a user's hand therethrough; said second band including a major portion and a minor portion, said minor portion being shorter than said major portion; and connection means on said second band for connecting said hand grip to an animal collar or to an animal leash.

2. The hand grip of claim 1 wherein said first and second bands are formed from a single length of material with the ends thereof stitched to adjacent portions of the material to create and define said first and second bands.

3. The hand grip of claim 2 wherein said material includes a generally coarse outer layer stitched along the edges thereof to a generally smooth inner layer, said layers enclosing a length of flexible, resilient foam material.

4. The hand grip of claim 2 wherein said first band has a generally D-shape with an arcuate portion and a generally straight portion, and said generally elliptical second band has an arcuate portion and a truncated end portion, said truncated end portion of said second band lying adjacent said generally straight portion of said first band and being stitched thereto.

5. The hand grip of claim 1 wherein said connection means includes a loop of material stitched to said back portion for reception of the free end of an animal leash.

6. The hand grip of claim 1 wherein said connection means includes a "D"-ring pivotally held by a short length of material extending transversely to said back portion and stitched thereto for reception of the free end of an animal leash.

7. The hand grip of claim 1 wherein said connection means includes: a "D"-ring pivotally held by a short length of material extending transversely to said back portion and stitched thereto; and a leash section attached at one end to said "D"-ring and having clasp means at the other end thereof.

8. The hand grip of claim 7 wherein said leash section can be selected from short, intermediate, or long lengths with the clasp means of short and intermediate lengths being adapted for connection to an animal leash and with the clasp means of long lengths being adapted for direct connection to an animal collar.

9. An animal leash hand grip comprising: a first narrow, generally circular band adapted to snugly receive a user's thumb therethrough; a second, narrow generally elliptical band integrally connected to said first band and adapted to snugly receive a user's hand therethrough; said second band including a major portion and a minor portion, said minor portion being shorter than said major portion; and connection means on said second band for connecting said hand grip to an animal collar or to an animal leash; wherein said first and second bands are formed from a single length of material with the ends thereof stitched to adjacent portions of the material to create and define said first and second bands; and wherein said material includes a generally coarse outer layer stitched along the edges thereof to a generally smooth inner layer, said layers enclosing a length of flexible, resilient foam material.

10. The hand grip of claim 9 wherein said first band has a generally D-shape with an arcuate portion and a generally straight portion, and said generally elliptical second band has an arcuate portion and a truncated end portion, said truncated end portion of said second band lying adjacent said generally straight portion of said first band and being stitched thereto.

* * * * *